United States Patent [19]
Maness et al.

[11] 3,911,081
[45] Oct. 7, 1975

[54] CATALYTIC OXIDATION OF NITRIC OXIDE IN MOLTEN SALT

[75] Inventors: Roy F. Maness, Richland; Raymond H. Moore; Charles A. Rohrmann, both of Kennewick, all of Wash.

[73] Assignee: Battelle Memorial Institute, Richland, Wash.

[22] Filed: June 28, 1972

[21] Appl. No.: 267,030

[52] U.S. Cl. ............. 423/210.5; 423/219; 423/235; 423/391; 423/395; 423/400; 423/402; 423/551
[51] Int. Cl. ............................................ B01d 53/34
[58] Field of Search ........... 423/235, 239, 549, 210, 423/215, 391, 219, 395, 551, 400, 402, 210.5, 393, 394; 252/440, 464

[56] References Cited
UNITED STATES PATENTS

| | | | |
|---|---|---|---|
| 1,653,023 | 12/1927 | Shapleigh et al. | 423/551 |
| 2,375,758 | 5/1945 | Bates | 423/395 |
| 2,381,908 | 8/1945 | Hurt et al. | 423/210.5 X |
| 3,362,786 | 1/1968 | Burkhardt | 423/210.5 X |
| 3,552,912 | 1/1971 | Bartholomew et al. | 423/242 |
| 3,552,921 | 1/1971 | Blytas | 423/210.5 |
| 3,647,358 | 3/1972 | Greenberg | 423/212 |
| 3,671,185 | 6/1972 | Lefrancois et al. | 423/242 |

OTHER PUBLICATIONS

Bazarova et al., "A Study of the Systems $K_2S_2O_7$—$V_2O_5$," The Institute of Catalysis, Siberian Branch of the Academy of Sciences of the USSR, Volume 180, No. 5, pp. 1132–1134, June 1968.
"Phase Studies on the Systems $Na_2SO_4$—$SO_3$, $K_2SO_4$—$SO_3$ and $Na_2SO_4$—$K_2SO_4$—$SO_3$," Journal of the Institute of Fuel, Mar. 1968, pp. 3–6.

Primary Examiner—Earl C. Thomas
Attorney, Agent, or Firm—Wells, St. John & Roberts

[57] ABSTRACT

A catalytic oxidation process is described for oxidizing nitric oxide to a higher oxide of nitrogen such as nitrogen dioxide in which a gaseous steam containing oxygen and nitric oxide is contacted with a molten alkali-metal sulfate salt containing an oxidizing agent of an oxide of vanadium to catalytically oxidize the nitric oxide in the presence of oxygen. The gaseous stream containing the higher oxide of nitrogen is then contacted with an absorbent to remove the nitrogen oxide from the gaseous stream. Preferably the absorbent is an alkali-metal carbonate that is maintained in a molten state of between 300° and 500°C. that reacts with the nitrogen oxide to form an alkali-metal nitrate.

13 Claims, 1 Drawing Figure

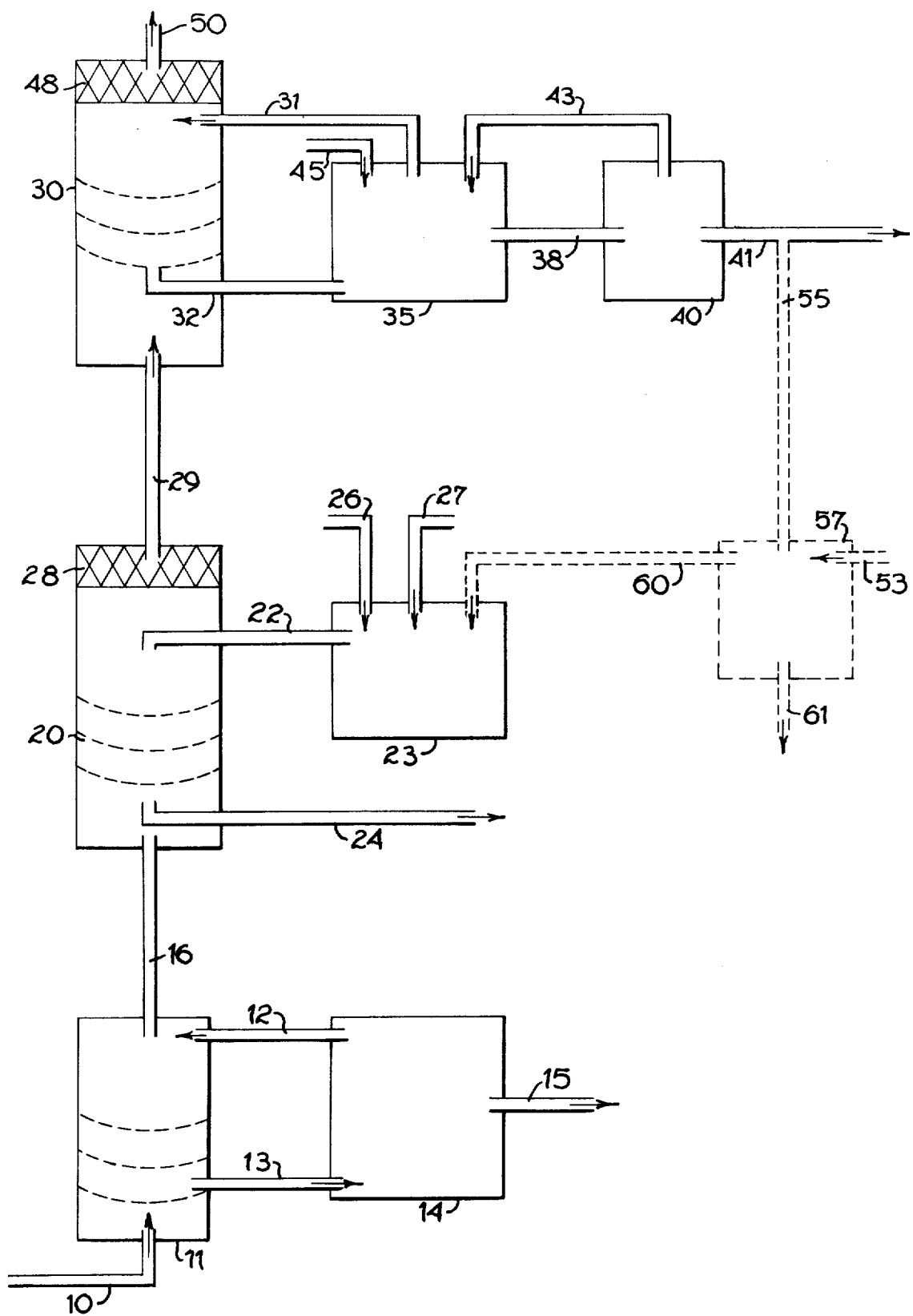

3,911,081

CATALYTIC OXIDATION OF NITRIC OXIDE IN MOLTEN SALT

BACKGROUND OF THE INVENTION

This invention relates to catalytic processes for the oxidation of nitric oxide to higher oxides of nitrogen and to processes for removing nitrogen oxides from gaseous streams.

During the performance of many combustion processes and certain commercial chemical processes, toxic nitric oxide is formed which is considered a major pollutant if allowed to pass directly to the atmosphere. Consequently attention has been directed to treating the hot off gases from these processes to remove the nitric oxide, however attempts for the most part proved inefficient or economically unattractive.

One of the principal objects of this invention is to provide a fused salt catalytic oxidation process for economically reducing toxic nitric oxide concentrations in exhaust, flue and other off gases.

An additional object of this invention is to provide a process for removing nitric oxide from a gaseous stream in an efficient manner.

A further object of this invention is to provide a process for removing toxic nitric oxide from gaseous streams in such a manner that a valuable by-product is formed.

An additional object of this invention is to provide a nitric oxide removal process in which relatively inexpensive reactants are utilized.

These and other objects and advantages of this invention will become apparent upon the reading of the following detailed description of preferred and alternate embodiments.

BRIEF DESCRIPTION OF THE DRAWING

Preferred and alternate embodiments of this invention are illustrated in a schematic process flow diagram.

DETAILED DESCRIPTION OF A PREFERRED EMBODIMENT

The present invention is broadly directed to a catalytic process for oxidizing nitric oxide (NO) to higher oxides of nitrogen and particularly to nitrogen dioxide ($NO_2$). For purposes of illustration, it will be assumed that the gaseous stream containing nitric oxide and oxygen is a product of combustion and is rather hot (above 250°C.) and may contain some residual particulate material such as fly ash which was not completely removed in upstream treatment facilities such as electrostatic precipitators.

Initially the gaseous stream enters through an inlet line 10 to a liquid scrubber 11 containing a molten alkali-metal salt of between 300° and 500° C. for removing particulate material from the gaseous stream without significantly decreasing the temperature of the gaseous stream. The molten alkali-metal salt is fed to the scrubber through line 12. The contaminated alkali-metal is removed from the scrubber 11 through line 13 to a filter 14. In the filter 14, the fly ash is removed through line 15 and the regenerated alkali metal salt solution is cycled back into the scrubber through the line 12. The hot gaseous stream leaves the scrubber through line 16 and enters a catalytic oxidizing reactor 20.

In the reactor 20, the hot gaseous stream containing nitric oxide and oxygen is contacted with a molten alkali-metal sulfate solution containing a vanadium oxide catalyst to convert the nitric oxide to a higher oxide of nitrogen and particularly to nitrogen dioxide. The molten alkali-metal salt sulfate is maintained in a molten state between temperatures of 300° and 500° C. The alkali-metal sulfate salt containing the catalyst vanadium oxide is fed into the reactor through line 22 from a storage tank 23. Vanadium oxide is added to the heated storage tank through line 26 and the alkali-metal sulfate salt is added through line 27. This system may be drained through line 24.

Broadly the process includes contacting the gaseous stream containing the nitric oxide with a molten liquid homogeneous catalyst salt mixture at a temperature between 300° and 500° C. in which the molten liquid salt mixture contains a dissolved or dispersed oxygen compound of vanadium to catalytically oxidize nitric oxide to nitrogen dioxide. The catalytic reaction (1) may be written as follows:

$$NO + \tfrac{1}{2} O_2 \xrightarrow{V_2O_5} NO_2 \qquad (1)$$

The molten salt is a mixture of alkali-metal sulfates (acid sulfates, pyrosulfates and normal sulfates) containing vanadium pentoxide ($V_2O_5$). Preferably the solution should be maintained at a temperature between 400° and 460° C. and contain between 5 and 20 mole percent vanadium pentoxide.

Other non-reactive molten salts may be included with the alkali-metal sulfate salt solution to serve as inexpensive inert dilutents. Preferably, the alkali-metal is selected from sodium or potassium.

Experimental data indicates that well over 80 percent of the nitric oxide may be catalytically oxidized to nitrogen dioxide by such a process.

Before leaving the reactor 20, the gaseous stream passes through a demister 28 to remove any entrained solid or liquid particles from the hot gaseous stream.

From the reactor 20, the hot gaseous stream containing the nitrogen dioxide passes through a line 29 into a reactor 30 for removing the nitrogen dioxide from the hot gaseous stream. In the reactor 30, the hot gaseous stream is contacted with a non-gaseous salt containing as an absorbent a non-gaseous alkaline salt such as a carbonate all of which is fluid in the temperature range of 250° to 500° C. and which will yield a relatively stable nitrate salt or react with nitrogen dioxide and form a non-gaseous nitrate salt. Preferably, the gaseous stream is contacted with a molten alkali-metal salt solution containing a carbonate salt maintained at a temperature between 300° and 500° C. The absorbent is continuously fed into the reactor through line 31 and the formed nitrate salt is removed from the reactor through line 32 to a recycle tank 35. In the recycle tank 35, a portion of the material is bled through line 38 to continuously remove the nitrate salt to prevent buildup of the nitrate salt in the reactor 30. Makeup carbonate salt is added through line 45 to the recycle tank 35. The portion that is bled through 38 is passed through a separator 40 to separate the nitrate salt from the carbonate salt with the absorbent salt directed back to the recycle tank through line 43. The nitrate salt passes from the separator through line 41 as a by-product of the process. It may be desirable to utilize either sodium, potassium or calcium carbonate as the absorbent which is converted to the corresponding nitrate for use directly as the fertilizer.

The solvation reaction (2) may be written as follows:

$$NO_2 + MCO_3 \rightarrow MNO_3 + CO_2 \qquad (2)$$

The absorbent ($MCO_3$) is selected from alkali-metal or alkali-earth-metal carbonate salts, or salts that will form carbonate salts in the presence of carbon dioxide. Exemplary of such materials includes potassium carbonate, sodium carbonate, sodium hydroxide, potassium hydroxide, calcium carbonate and calcium oxide. Preferably, the absorbent is supported (dispersed or dissolved) in a molten alkali-metal carbonate-nitrate salt system having a temperature less than 500° C. The eutectic melting point of a solution of sodium nitrate and sodium carbonate is approximately 300° whereas the eutectic melting point of a potassium nitrate-potassium carbonate system is approximately 330° C. It is preferable to have a binary salt system of alkali-metal nitrate and alkali-metal carbonate, however a ternary alkali-metal nitrate-carbonate system is acceptable. Suitable binary alkali-metal systems contain in mole percentage 80–95 alkali-metal nitrate and 5–20 alkali-metal carbonate. Preferably the system should contain between 5 and 10 mole percent of the alkali-metal carbonate. It is desirable to bleed off a sufficient amount of the alkali-metal carbonate-nitrate system from the reactor 30 to prevent the decrease of the carbonate content below its acceptable value.

If the gaseous stream contains carbon dioxide, then alkali-metal hydroxide would be acceptable, because the hydroxide immediately forms a carbonate with the carbonate reacting with the nitrogen oxide to form the nitrate.

Other non-reacting molten salts may be combined with the alkali-metal carbonate-nitrate solution to serve as inexpensive dilutents or to lower the temperature of the molten solution.

As an alternative embodiment the bled alkali-metal nitrate salt may be directed through line 55 to a reacting tank 57 for contact with sulfuric acid from line 53. The sulfuric acid reacts with the alkali-metal nitrate to form an alkali-metal sulfate which may be utilized as a source material in the reactor 20. The contact of the sulfuric acid with the alkali-metal nitrate forms nitric acid which may be removed via line 61 from the reacting tank 57 and utilized or sold as a by-product.

After the nitrogen oxide is removed, the hot gaseous stream is passed through a demister 48 to remove any entrained liquid or solid particles therein. The gaseous stream leaving the reactor through line 50 has a reduced nitrogen oxide content and depending upon the circumstances may be emitted directly into the atmosphere.

Any of various well-known contact methods and equipment may be utilized in the reactors 20 and 30 to insure rapid reaction between the absorbent and the nitrogen dioxide in the fused salts. Such equipment includes wet wall contactors, packed columns, absorbers containing perforated plates or bubble plate trays. A spray technique can also be utilized.

It should be understood that the above described embodiment is simply illustrative of the principles of this invention and numerous other embodiments may be readily devised without deviating therefrom. Therefore only the following claims are intended to define this invention.

What is claimed is:

1. A process for treating a gaseous stream containing nitric oxide and oxygen, comprising the step:
   contacting the gaseous stream with a molten alkali-metal sulfate solution of a temperature between 300° and 500° C containing a catalyst of vanadium pentoxide to catalytically oxidize the nitric oxide to a higher oxide of nitrogen, in which the molten alkali-metal sulfate solution comprises a mixture of sulfates selected from a group consisting of normal sulfates, acid sulfates, and pyrosulfates.

2. A process as defined in claim 1 wherein the molten alkali-metal sulfate solution contains a mixture of alkali-metal sulfate and alkali-metal pyrosulfate.

3. The process as defined in claim 1 wherein the molten alkali-metal salt solution is maintained at a temperature between 400° C. and 460° C.

4. The process as defined in claim 1 wherein the alkali-metal is selected from a group consisting of sodium and potassium.

5. The process as defined in claim 1 further comprising the step of contacting the gaseous stream subsequently to the oxidation of the nitric oxide to a higher oxide of nitrogen with a molten absorbent of non-gaseous carbonate salt or a salt that forms a carbonate in the presence of carbon dioxide which reacts with the higher oxide of nitrogen to absorb the higher oxide of nitrogen and form a non-gaseous nitrate salt.

6. The process as defined in claim 5 wherein the molten absorbent is selected from a group consisting of potassium carbonate, sodium carbonate, potassium hydroxide, sodium hydroxide, calcium carbonate and calcium oxide.

7. The process as defined in claim 6 wherein the molten absorbent is maintained at a temperature above 250° C while in contact with the gaseous stream.

8. The process as defined in claim 5 wherein the non-gaseous salt is an alkali-metal carbonate selected from an alkali-metal group consisting of sodium and potassium.

9. The process as defined in claim 8 wherein the molten absorbent includes a molten solution of the alkali-metal carbonate dissolved in alkali-metal nitrate.

10. The process as defined in claim 8 further comprising the step of maintaining the alkali-metal carbonate salt content in the solution between 5 and 20 mole percent.

11. The process as defined in claim 8 wherein the gaseous stream is passed through a gas-liquid reactor and wherein the molten alkali-metal carbonate contacts the gaseous stream in said reactor and wherein the process further comprises the steps of continuously adding the alkali-metal carbonate salt to the reactor and continuously bleeding a portion of the molten alkali-metal carbonate-nitrate solution from the reactor.

12. The process as defined in claim 5 further comprising the step of contacting the alkali-metal nitrate salt with sulfuric acid to form nitric acid and regenerated alkali-metal sulfate.

13. The process as defined in claim 12 further comprising the steps of:
   separating the nitric acid and regenerated alkali-metal sulfate; and
   adding the regenerated alkali-metal sulfate to the molten alkali-metal sulfate solution defined in claim 1.

* * * * *